United States Patent [19]

Fujiwara

[11] Patent Number: 5,034,988
[45] Date of Patent: Jul. 23, 1991

[54] METHOD AND SYSTEM FOR FITTING IMAGE POSITIONS

[75] Inventor: Sigemi Fujiwara, Ootawara, Japan

[73] Assignee: Kabushiki Kaisha Toshiba, Kawasaki, Japan

[21] Appl. No.: 416,040

[22] Filed: Oct. 3, 1989

[30] Foreign Application Priority Data

Oct. 7, 1988 [JP] Japan .................................. 63-252977

[51] Int. Cl.$^5$ .............................................. G06K 9/32
[52] U.S. Cl. ......................................... 382/6; 378/20; 378/62; 364/413.16; 364/413.23
[58] Field of Search ................... 382/6, 34; 378/99, 62, 378/162, 20, 5; 358/416.23, 416.16

[56] References Cited

U.S. PATENT DOCUMENTS

| | | | |
|---|---|---|---|
| 4,635,293 | 1/1987 | Watanabe | 382/6 |
| 4,644,582 | 2/1987 | Morishita et al. | 378/20 |
| 4,685,146 | 8/1987 | Fenster et al. | 364/413.23 |
| 4,736,437 | 4/1988 | Sacks et al. | 382/34 |
| 4,769,756 | 9/1988 | Webber et al. | 364/413.16 |
| 4,802,093 | 1/1989 | Ema | 378/99 |
| 4,870,692 | 9/1989 | Zuiderveld et al. | 382/6 |
| 4,872,188 | 10/1989 | Lauro et al. | 378/62 |

Primary Examiner—David K. Moore
Assistant Examiner—Yon Jung
Attorney, Agent, or Firm—Finnegan, Henderson, Farabow, Garrett and Dunner

[57] ABSTRACT

In each of two images obtained by a digital radiography system, for example, a mask image and a live image, two regions of interest are set by a cutout position setting section. Images within corresponding regions of interest are subjected to subtraction in a subtraction processing section. By calculating the entropy of one of two subtraction images in an entropy calculating section, amounts of shift to make the entropy local minimum is searched for. By using the amounts of shift to make the entropy local minimum, an amount of rotation is searched for, which makes the entropy of the other subtraction image local minimum. The amounts of shift and rotation are set by a parameter setting section in accordance with the calculated entropy.

7 Claims, 4 Drawing Sheets

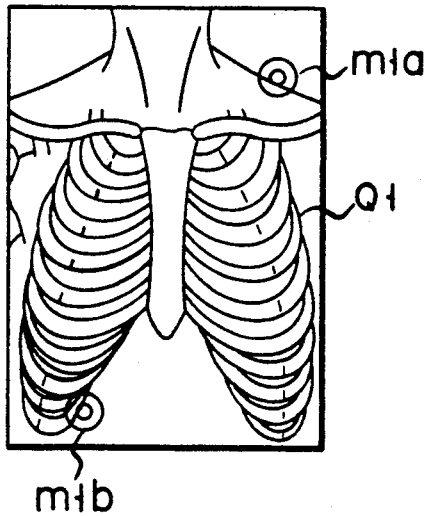
F I G. 1A
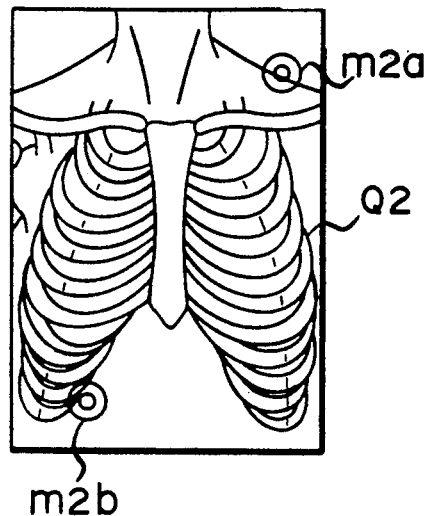
F I G. 1B
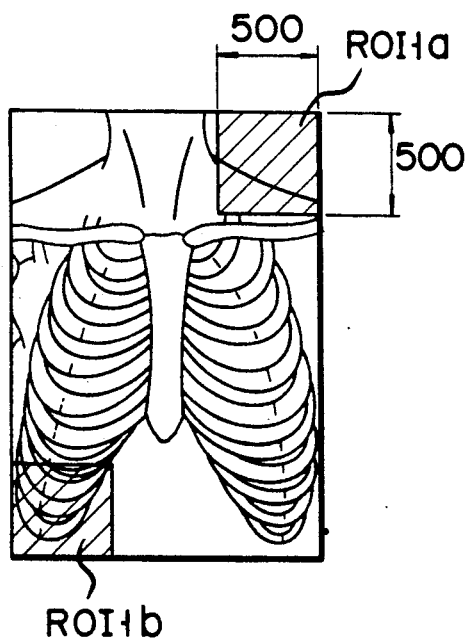
F I G. 2A
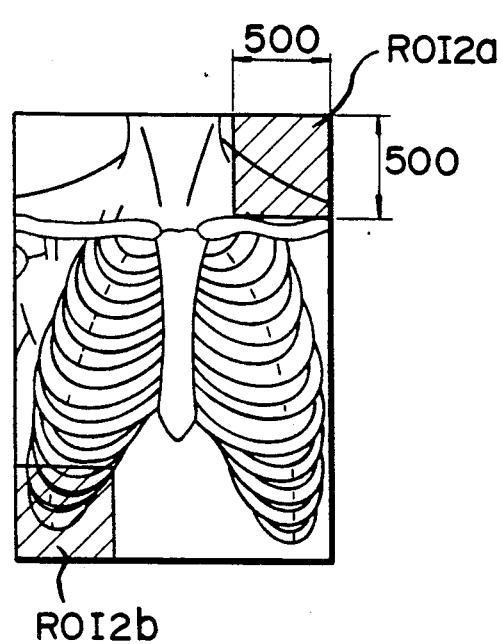
F I G. 2B

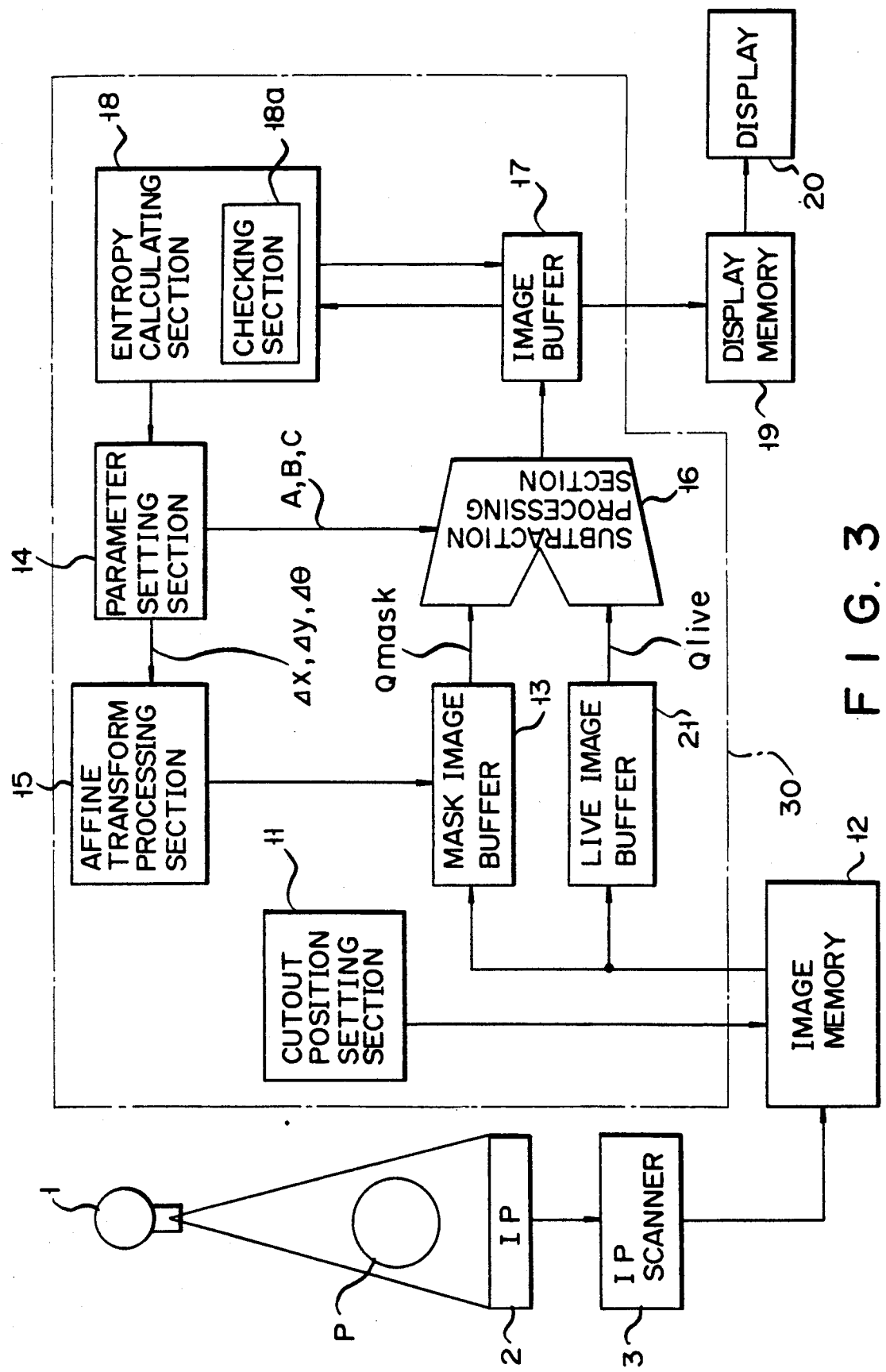
F I G. 3

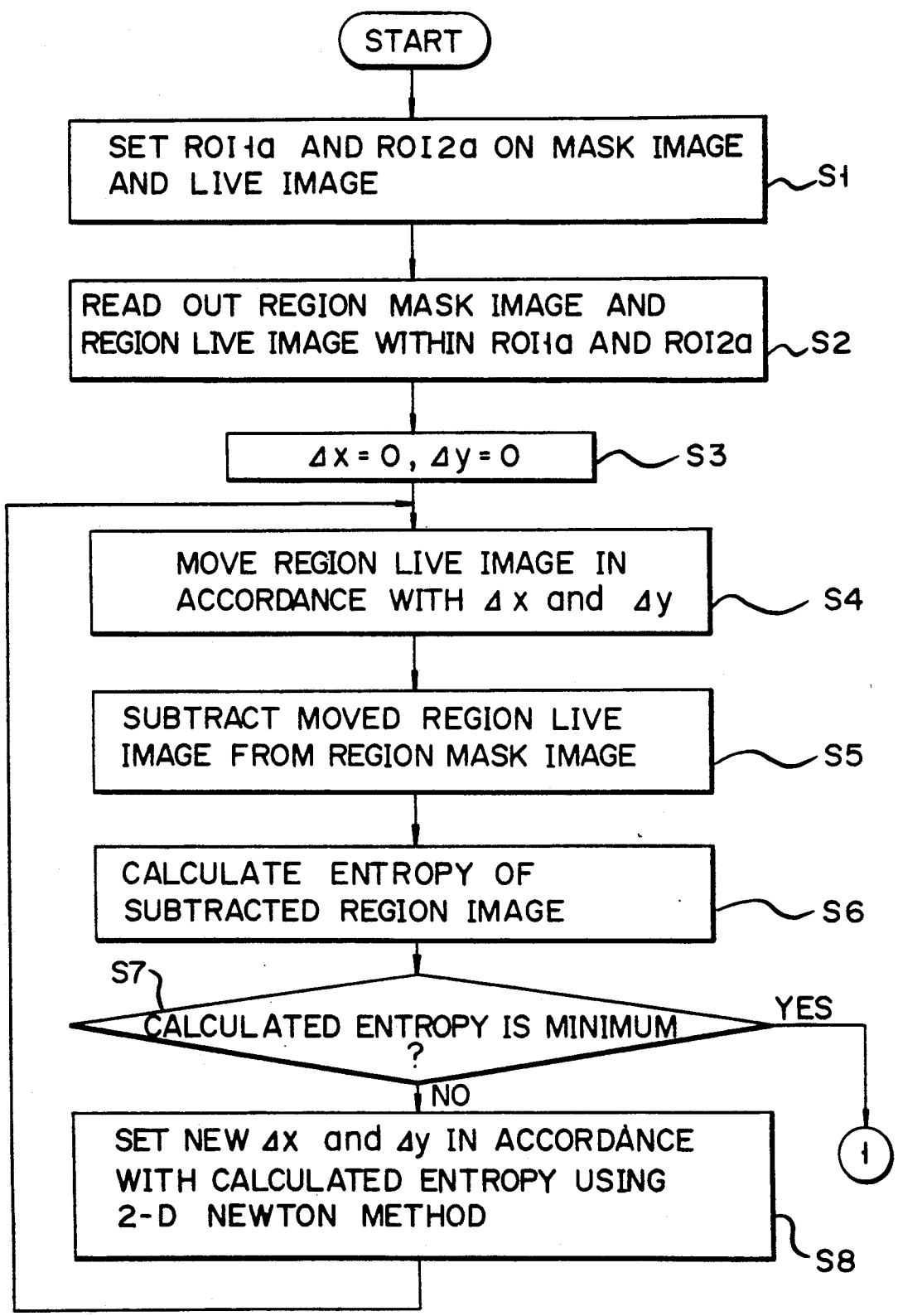
F I G. 4A

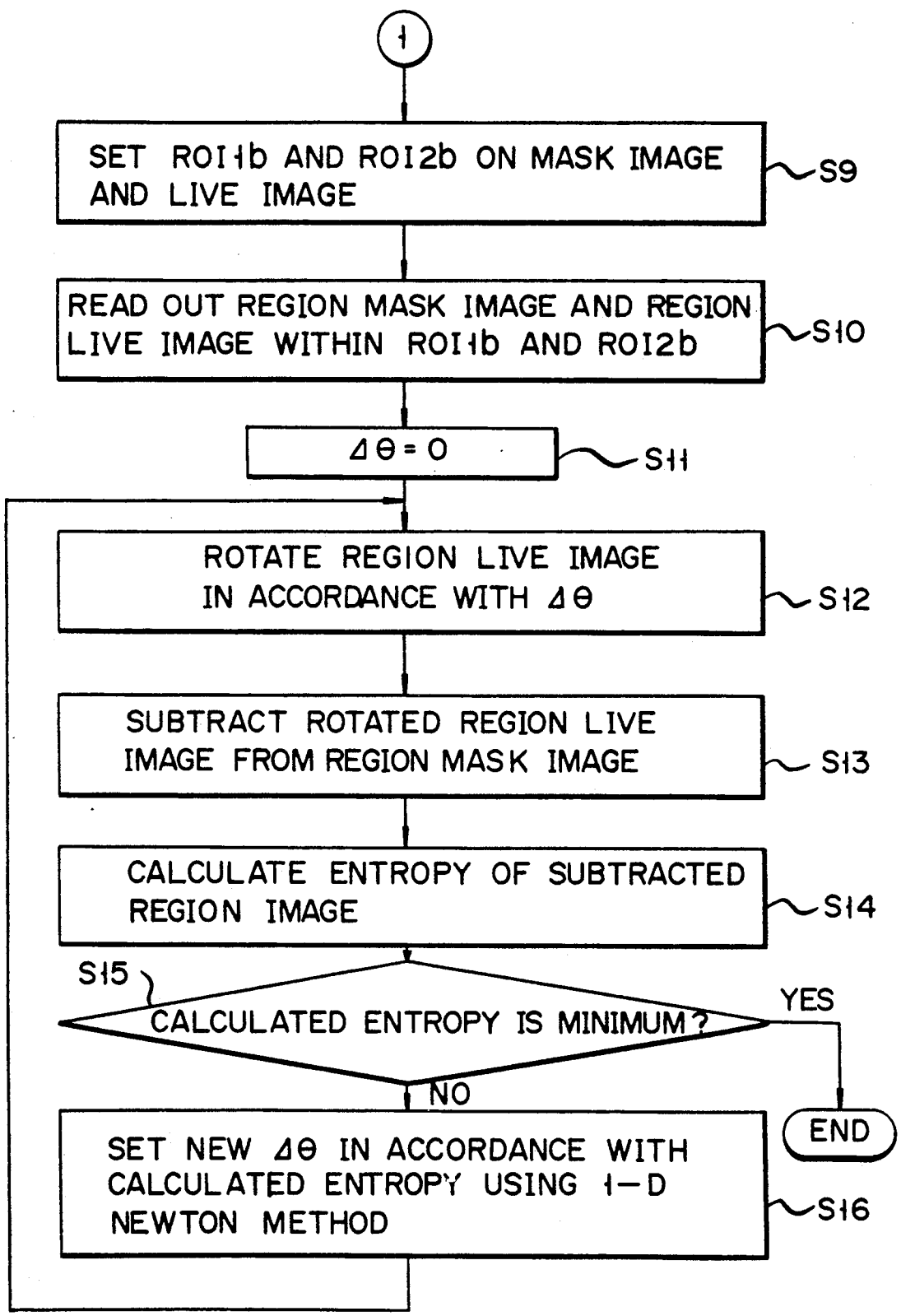
F I G. 4B

METHOD AND SYSTEM FOR FITTING IMAGE POSITIONS

BACKGROUND OF THE INVENTION

1. Field of the Invention

The present invention relates to a method and system for fitting image positions.

2. Description of the Related Art

An energy subtraction process and a temporal subtraction process are performed in a digital radiography system using a storage fluorescent material. For example, in the energy subtraction process, two images obtained at different energy levels are subjected to subtraction for displaying a difference image representing the difference between the two images.

In such subtraction processes, the following two methods have been used for fitting positions of two images with respect to each other.

(1) Exclusive markers formed of a X-ray absorbing material such as a heavy metal, are attached to previously determined positions, for example, the top right-hand corner and the bottom left-hand corner of a cassette into which imaging plate (IP) is inserted. By irradiating the IPs with X-rays at different levels through a subject under examination, images Q1 and Q2 of the subject and images m1a, m1b, m2a and m2b of the exclusive markers are formed as shown in FIGS. 1A and 1B. The marker positions on the images Q1 and Q2 are detected to determine the subtraction position in which the two images are subjected to the subtraction process.

(2) Such a subtraction position as to make the entropy of a subtraction image minimum is searched for. More specifically, the subtraction process is performed while shifting the subtraction position by using three parameters, i.e., an amount of lateral shift, an amount of longitudinal shift and an amount of rotation so as to calculate the entropy of the subtraction images. The subtraction position is determined by such three parameters as to make the entropy minimum.

The entropy E is represented as follows:

$$E = \sum_{i=1}^{N} Pi\log(1/Pi)$$

where Pi is the number of pixels whose gray level of an image is i and N is the number of gray levels of the image.

However, the above two methods have the following problems. That is, in the case of the first method, the exclusive marker images will necessarily be formed on an image of a subject in usual photography by the us of general-purpose X-ray photographing equipment. If the exclusive markers were not used, it would be impossible to fit the positions of two images for the subtraction process.

On the other hand, in the case of the second method, it will take long to calculate the entropy of digital radiography images having a large number of pixels.

In view of the foregoing, there is a demand for an apparatus which allows easy and rapid position fitting of images to be subjected to subtraction.

SUMMARY OF THE INVENTION

It is an object of the present invention to provide a method and system for fitting image positions.

According to one aspect of the present invention, there is provided a method for fitting image positions, the method comprising the steps of:

acquiring a plurality of images;

setting a plurality of regions on each acquired image;

cutting out a plurality of region images within the set regions;

setting position fitting parameters;

moving at least one region image outside a standard region image selected from the region images in accordance with the set position fitting parameters;

subtracting the moved region image from the standard region image, thereby obtaining a subtraction image;

calculating an entropy of the subtraction image; and fitting the image positions among the acquired images in accordance with the set position fitting parameters, when the calculated entropy reaches a minimum.

According to another aspect of the present invention, there is provided a system for fitting image positions, the system comprising:

acquiring means for acquiring a plurality of images;

region setting means for setting a plurality of regions on each acquired image;

cutting out means for cutting out a plurality of region images within the set regions;

parameter setting means for setting position fitting parameters;

moving means for moving at least one region image outside a standard region image selected from the region images in accordance with the set position fitting parameters;

subtracting means for subtracting the moved region image from the standard region image, thereby obtaining a subtraction image;

entropy calculating means for calculating an entropy of the subtraction image; and fitting means for fitting the image positions among the acquired images in accordance with the set position fitting parameters, when the calculated entropy reaches a minimum.

BRIEF DESCRIPTION OF THE DRAWINGS

FIGS. 1A and 1B are diagrams for illustrating a conventional method of fitting image positions by use of markers;

FIGS. 2A and 2B are diagrams for illustrating a method of fitting image positions according to the present invention;

FIG. 3 is a block diagram of a system for fitting image positions according to the present invention; and FIGS. 4A and 4B are a flowchart of the operation of the image position fitting system of the present invention.

DETAILED DESCRIPTION OF THE PREFERRED EMBODIMENTS

Parameters of amounts of shift $\Delta X$ and $\Delta Y$ and an amount of rotation $\Delta\theta$ are used to position-fit two images each having an image of a subject under examination. Hereinafter, a description will be made of a case where two digital images are position-fit with respect to each other which have $1760 \times 1760$ pixels and a gray level of 10 bits (0−1023).

As shown in FIGS. 2A and 2B, regions of interest ROI1a and ROI2a (each of $500 \times 500$ pixels) are respectively set at the top right-hand corners of two images. Images within the regions of interest are cut out. The cut-out images are subjected to a subtraction process. The entropy E of a subtraction image obtained by the subtraction process is calculated as follows:

$$E = \sum_{i=1}^{N} Pi \log_2(1/Pi)$$

where Pi is the number of pixels having a gray level of i and N is the number of gray levels of the subtraction image. To obtain the amounts of ΔX and ΔY shifts required to make the entropy E minimum (local minimum in the present embodiment) a general extremum-search method such as the two-dimensional Newton method is used.

When the amounts of shift ΔX and ΔY are obtained by which the entropy of the subtraction image is made minimum, ROI1b and ROI2b (each of 500×500 pixels) are set at the bottom left-hand corners of the images. The images within the regions ROI1b and ROI2b are cut out. The cut-out images are then subjected to subtraction.

As amounts of shift ΔX and ΔY are obtained in the subtraction process, the previously obtained amounts of shift ΔXo and ΔYo are used. The images are rotated by an amount of rotation Δθ with their centers of rotation at the respective centers of regions ROI1a and ROI2a. Consequently such an amount of rotation Δθ as to make the entropy of the subtraction image minimum (local minimum in the present embodiment) is searched for.

To search for the amount of rotation Δθ, the extremum-search method for one parameter, such as the one-dimensional Newton method, may be used.

The parameters ΔX, ΔY and Δθ to make the entropy minimum are searched for in that way. In the case of digital radiography images having a large number of pixels, accordingly, by performing the extremum search two times on regions with a relatively small number of pixels, it becomes possible to fit positions of two images to be subjected to subtraction with respect to each other rapidly and accurately.

Next, a system for performing the above image position fitting will be described.

In the system of the present invention shown in FIG. 3, X-rays generated by an X-ray tube 1 are radiated to an imaging plate (IP) 2 through a subject P under examination. The X-ray information recorded on IP 2 is read by an IP scanner 3.

An image memory 12 stores image information output from IP scanner 3. The image information stored in image memory 12 includes mask images and live images. The mask images are obtained without the use of contrast medium, while the live images are obtained by the use of contrast medium.

An image position fitting unit 30 comprises a cutout position setting section 11, a mask image buffer 13, a live image buffer 21, a subtraction processing section 16, an image buffer 17, an entropy calculating section 18, a parameter setting section 14 and an affine transform processing section 15.

Mask image buffer 13 stores an image (hereinafter referred to as a region mask image) within a region of interest of a mask image, while live image buffer 21 stores an image (hereinafter referred to as a region live image).

Cutout position setting section 11 sets regions of interest at the top right-hand corner and bottom left-hand corner of an image stored in image memory 12 as the cutout positions of the image.

Parameter setting section 14 stores extremum-search algorithms according to the above one-dimensional and two-dimensional Newton methods and sets the position fitting parameters, i.e., amounts of shift ΔX and ΔY and an amount of rotation Δθ in accordance with the entropy E calculated by entropy calculating section 18 using the stored extremum-search algorithms. Δθ is a rotation angle with their rotation centers at the respective centers of ROI1a and ROI2a.

Affine transform processing section 15 calculates the position of image data according to the parameters ΔX, ΔY and Δθ.

Subtraction processing section 16 performs subtraction process on two images on the basis of a region mask image, Qmask, stored in mask image buffer 13, a region live image, Qlive, stored in live image buffer 21 and parameters ΔX, ΔY and Δθ set by parameter setting section 14.

Image buffer 17 stores a subtraction image obtained in subtraction processing section 16.

Entropy calculating section 18 calculates the entropy of the subtraction image transferred from subtraction processing section 16 via image buffer 17.

When the search for the subtraction position is completed, the subtraction image stored in image buffer 17 is displayed on a display 20 via a display memory 19.

The search for the subtraction position is completed when a checking section 18a of entropy calculating section 18 determines the entropy of the subtraction image to be minimum.

Next, the operation of the system will be described with reference to FIGS. 4A and 4B.

In step S1, regions of interest ROI1a and ROI2a are set, respectively, at the top right-hand corner of a mask image and the top right-hand corner of a live image stored in image memory 12 by cutout position setting section 11. In step S2, a region mask image within ROI1a is read out from image memory 12 and entered into subtraction processing section 16 via mask image buffer 13. Also, a region live image within ROI2a is read out from image memory 12 and entered into subtraction processing section 16 via live image buffer 21.

In step S3, initial values of position fitting parameters ΔX and ΔY are set to 0 in parameter setting section 14.

In affine transform processing section 15, the position of image data is calculated according to the position fitting parameters ΔX and ΔY and then entered into subtraction processing section 16 via mask image buffer 13. At this point, for example, the movement position of the region live image is calculated and the region live image is moved (step S4).

Assuming that subtraction parameters A, B and C set by parameter setting section 14 are 1, −1 and 511, respectively, a subtraction image I of the region mask image and region live image is calculated by subtraction processing section 16 as follows (step S5):

$$I = A \times Qmask + B \times Qlive + C$$

The subtraction image calculated as above is entered into entropy calculating section 18 via image buffer 17.

In step S6, the entropy of the entered subtraction image is calculated by entropy calculating section 18. The calculated entropy is then entered into parameter setting section 14.

In step S7, in checking section 18a of entropy calculating section 18, it is determined whether the entered entropy is a local minimum or not.

In step S7, when it is determined that the entered entropy is not a local minimum, the entropy calculated by entropy calculating section 18 is entered into parameter setting section 14. In step S8, the new position fitting parameters ΔX and ΔY are set by parameter setting section 14 on the basis of the entered entropy. The new parameters are then entered into affine transform processing section 15.

The above steps S4 to S8 are performed repeatedly to determine parameters ΔX and ΔY that make the entropy of the image a local minimum.

In step S7, when it is determined that the entered entropy is a local minimum, the parameter Δθ is determined by the same process as with ROI1a and ROI2a.

That is, in step S9, regions ROI1b and ROI2b are set at the bottom left-hand corners of the mask and live images. In step S10, a region mask image within ROI1b and a region live image within ROI2b are read out from image memory 12 and then entered into subtraction processing section 16 via mask image buffer 13 and live mask buffer 21.

In step S11, 0 is set as the initial value of position fitting parameter Δθ. In step S12, the region live image is rotated according to position fitting parameter Δθ.

In step S13, the subtraction process is performed on the region mask image and the rotated region live image.

In step S14, the entropy of the subtraction image obtained by the subtraction process in step S13 is calculated.

In step S15, it is determined whether or not the calculated entropy a is local minimum. When the calculated entropy is not a local minimum, a new position fitting parameter Δθ is set on the basis of the calculated entropy in step S16.

The above steps S12 to S16 are performed repeatedly to determine the parameter Δθ that makes the entropy of the image a local minimum.

By determining parameters ΔX, ΔY and Δθ that make the entropy of the image a local minimum in accordance with the above processes, it becomes possible to position-fit two images with respect to each other. It is actually desired that the search for the position in which the entropy of the image is truly a minimum. As in the present embodiment, however, the search for the position in which the entropy of the image is a local minimum also allows two images to be position-fit with respect to each other with sufficient accuracy. In addition, in the present invention, there is no need for position-fitting of the overall regions of images, thus saving process time considerably.

Moreover, the present invention permits the position-fitting of three or more images.

Although only one embodiment of the present invention has been disclosed and described, it is apparent that other embodiments and modifications of the invention are possible.

What is claimed is:

1. A method for fitting image positions, comprising the steps of:
    acquiring a plurality of images;
    setting a plurality of regions on each acquired image;
    cutting out a region image within each set region;
    setting position fitting parameters;
    moving at least one region image outside a standard region image in accordance with the set position fitting parameters;
    subtracting at least one moved region image from the standard region image, thereby obtaining a subtraction image;
    computing an entropy of the subtraction image; and
    fitting the image positions among the acquired images in accordance with the set position fitting parameters, when the computed entropy reaches a minimum value; wherein
    the regions set in each of the acquired images includes a first region and a second region, said first and second regions being spaced apart by a predetermined interval and set in a diagonal arrangement.

2. The method according to claim 1, wherein the position fitting parameters include shift parameters for shifting each region image.

3. The method according to claim 1, wherein the position fitting parameters include shift parameters for shifting each region image and a rotation angle parameter for rotating each region image.

4. A system for fitting image positions, comprising:
    acquiring means for acquiring a plurality of images;
    region setting means for setting a plurality of regions on each acquired image;
    cutting out means for cutting out a region image within each set region;
    parameter setting means for setting position fitting parameters;
    moving means for moving at least one region image outside a standard region image in accordance with the set position fitting parameters;
    subtracting means for subtracting the moved region image from the standard region image, thereby obtaining a subtraction image;
    entropy computing means for computing an entropy of the subtraction image; and
    fitting means for fitting the image positions among the acquired images in accordance with the set position fitting parameters, when the computed entropy reaches a minimum value; wherein
    the regions set in each of the acquired images includes a first region and a second region, said first and second regions being spaced apart by a predetermined interval and set in a diagonal arrangement.

5. The system according to claim 4, wherein the position fitting parameters include shift parameters for shifting each region image.

6. The system according to claim 4, wherein the position fitting parameters include shift parameters for shifting each region image and a rotation angle parameter for rotating each region image.

7. The method according to claim 1, wherein the setting, moving, subtracting, and computing steps are sequentially repeated when the computed entropy is larger than a minimum value.

* * * * *